Feb. 17, 1959     J. MERCIER     2,873,763
SEALING MEANS FOR A SLIDABLE MEMBER IN A PRESSURE UNIT
Original Filed Jan. 22, 1954
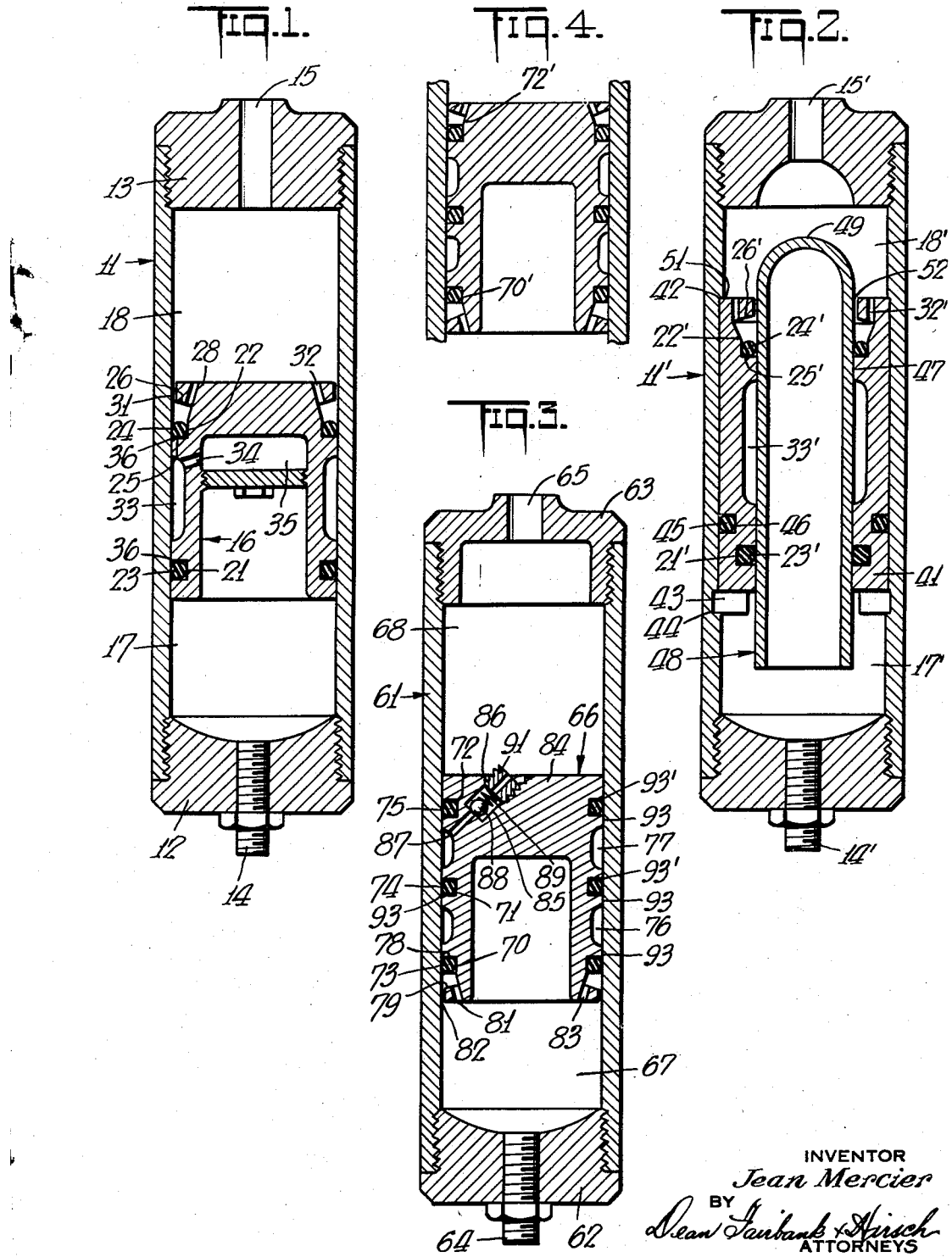
INVENTOR
Jean Mercier
BY
Dean Fairbank + Hirsch
ATTORNEYS

2,873,763

SEALING MEANS FOR A SLIDABLE MEMBER IN A PRESSURE UNIT

Jean Mercier, New York, N. Y.

Original application January 22, 1954, Serial No. 405,581, now Patent No. 2,774,619, dated December 18, 1956. Divided and this application February 13, 1956, Serial No. 565,025

3 Claims. (Cl. 138—31)

This invention relates to the sealing means for a slidable member in a pressure unit and more particularly to sealing means including a resilient ring type seal.

As conducive to an understanding of the invention it is noted that where a single resilient ring type seal, such as an O ring is used, the effectiveness of such seal is poor when the pressure on opposed sides of the O ring is identical, for such seal only operates effectively when there is greater pressure on one side than on the other.

Where there is a difference between the pressures on opposed sides of an O ring and these pressures should reverse, at the moment when both pressures are equal, the sealing effect will be poor.

Where two O rings are used, for example, for the piston of a pressure accumulator on each side of an annular groove, as the piston moves during normal use of the accumulator, the pressure in the groove between the O rings will rise due to the slight leakage past the O rings. If such pressure, which is applied to the adjacent sides of the two O rings, should increase to an amount equal to the pressures on the other sides of both of the O rings, no dependable seal would be afforded between the two chambers defined in the accumulator by the piston.

It is accordingly among the objects of the invention to provide sealing means, including at least one O ring, for the slidable member of a pressure unit which will insure that at substantially all times in normal operation of the unit, the pressure on one side of said O ring will be less than the pressure on the other side of said O ring for dependable sealing action, and which will prevent extrusion and injury to such O ring by relieving the pressure thereagainst, which sealing means is simple in construction using substantially conventional components, none of which are delicate or likely to become deranged even with long periods of use, and which will substantially preclude leakage of fluid under pressure from one side of the sealing means to the other.

According to the invention from its broader aspect, the sealing means comprises at least two resilient seals, one of which is an O ring and which are associated with the sliding member which may be subjected to different pressures thereagainst on the portions thereof on opposed sides of the sealing means, and valve means are provided to discharge fluid from the space between the two seals when a predetermined pressure has been attained therein.

According to one embodiment of the invention, both of the resilient seals are O rings encompassing a piston slidably mounted in a pressure vessel and defining a chamber therein on each side, for gas and oil, and an annular groove is defined between the two O rings. Both of the O rings are positioned in associated annular grooves and the groove adjacent the end of the piston nearest the chamber of the pressure vessel which is charged with oil under pressure, is elongated and is in communication with such chamber by means of a passageway extending through the piston and leading into the end of the annular groove adjacent said piston end. More particularly, the elongated annular groove is of width at its inner end such that the O ring will fit snugly and is of width at its outer end sufficient for the O ring to fit loosely therein.

According to another embodiment of the invention, both of the resilient seals are O rings encompassing a piston slidably mounted in a pressure vessel and defining a chamber therein on each side for gas and oil, and an annular groove is defined between the two O rings. Both of the O rings are positioned in associated annular grooves and the annular groove between the O rings is in communication with the oil chamber by means of a passageway extending through the piston, said passageway having an associated valve to permit discharge of fluid from the annular groove between the O rings when a predetermined pressure has been attained therein.

This specification is a division of co-pending application Serial No. 405,581, filed January 22, 1954, now Patent 2,774,619, issued Dec. 18, 1956.

In the accompanying drawings in which are shown one or more of various possible embodiments of the several features of the invention, Fig. 1 is a longitudinal sectional view of a piston accumulator according to one embodiment of the invention, and Figs. 2, 3 and 4 are longitudinal sectional views of piston accumulators according to other embodiments of the invention.

Referring now to the drawing, in the embodiment shown in Fig. 1, the pressure relief means is incorporated in a pressure accumulator comprising a substantially cylindrical container 11 having plugs 12 and 13 screwed in each end thereof, said plugs having a gas inlet port 14 and a fluid port 15, respectively.

Slidably mounted in the container 11 is a piston 16 defining a gas chamber 17 and a fluid chamber 18 in communication with the ports 14 and 15, respectively.

The piston has a pair of peripheral annular grooves 21 and 22 in each of which is positioned a resilient sealing member, preferably an O ring 23 and 24 to provide a seal between the piston and the inner surface of the container 11.

The annular groove 22 which is desirably of greater length than groove 21, is of width at its inner end 25 slightly less than the diameter of the O ring and at its outer end 26 of greater width than such diameter so that when the O ring is at the inner end it will fit snugly to provide a seal, and when at the outer end, will fit loosely.

The periphery of piston 16 at its end 28 is desirably spaced slightly from the wall of container 11 as at 31 to ensure that clearance will be provided therebetween and a plurality of passageways 32 through the end 28 of the piston provide communication between chamber 18 and the wide end 26 of annular groove 22.

Desirably the piston 16 has an elongated annular groove 33 in its periphery between grooves 21 and 22 which may be in communication by means of a passageway 34 with a chamber 35 in the piston.

Before the chambers 17 and 18 are charged, the pressure in such chambers and in annular groove 33 will be atmospheric. When chambers 17 and 18 are charged, for example, with air and oil under pressure, as the pressure in groove 33 is still atmospheric, there will be a differential between the pressures on opposed sides of each of the O rings 23 and 24 and consequently they will be forced toward each other wedging into the slight space 36 between the wall of the container 11 and the periphery of the piston to provide a dependable seal. Thus there will be substantially no leakage between the fluids in the chambers 17 and 18.

In use of the unit, a valve (not shown) controlling the oil port 15 is opened. As a result, the pressure in chamber 18 will drop and by reason of the greater pressure in chamber 17, the piston will move upwardly (Fig. 1) forcing oil from chamber 18.

As a resulting of such movement of the piston 16, oil adhering to the wall of the container may be forced past seal ring 24 into the annular groove 33 and the pressure in such groove due to the compression of the air therein and in chamber 35 will increase.

As long as the pressure in groove 33 remains below that in chambers 17 and 18, the O rings 23, 24 will remain wedged into the spaces 36 to form dependable seals due to the difference between the pressure on opposed sides of the O rings.

If the pressure in groove 33 should continue to rise with repeated operation of the accumulator and movement of the piston, with resultant leakage past O ring 24, when such pressure exceeds the pressure in chamber 18, the O ring will be moved toward the outer end 26 of the annular groove 22. As a result, the O ring will then fit loosely in the wider end 26 of groove 22 and will no longer form an effective seal. Consequently, the oil under pressure in groove 33 will be forced by the air compressed in such groove out of the clearance 31 and the passageway 32 to relieve the pressure in such groove 33.

The provision of both the clearance 31 and passageway 32 ensures that one or the other or both will be open for relief of pressure in groove 33.

As the pressure in the gas chamber 17 is never less than the minimum pressure attained in chamber 18, it is apparent from the foregoing that the pressure in annular groove 33 will always be less than that in chamber 17 and hence the O ring 23 will remain wedged in the associated space 36 to form a dependable seal, thereby preventing leakage between chambers 17 and 18.

As the O rings are designed to withstand the maximum pressures utilized in the chambers 17 and 18 without extrusion, and as the movement of O ring 24 will occur before the pressure in groove 33 can rise above such pressure, extrusion of O ring 23 with resultant injury thereto is precluded.

When the piston reaches the upper end of the container 11 shown in Fig. 1, i. e., when all the oil has been discharged from the container, the pressure in chamber 18 will be substantially atmospheric. At this time the O ring 23 will provide a dependable seal as the pressure in chamber 17 will be greater than that in groove 33 which now also is substantially atmospheric.

When the chamber 18 is again recharged with oil under pressure, the O ring 24 will be forced toward the smaller end of groove 22 to wedge into the associated space 36 to again provide a dependable seal. Thus the O ring 24 functions as a one-way valve.

The embodiment shown in Fig. 2 is substantially identical to that shown in Fig. 1 and corresponding parts have the same reference numerals primed.

As shown in Fig. 2, a sleeve 41 is securely mounted in container 11' and is retained at one end against an annular shoulder 42 in the container by means of a snap ring 43, for example, reacting against the other end of the sleeve 41 and retained in an annular groove 44 in the wall of the container.

In order to provide a seal between the juxtaposed surfaces of the container 11' and the sleeve 41, a resilient sealing ring 45 is positioned in annular groove 46 in the outer periphery of sleeve 41.

Slidably mounted in the bore 47 of sleeve 41 between ports 14' and 15' is a piston 48, illustratively a tubular member having at least one of its ends closed as at 49. To provide a dependable seal between the chambers 17' and 18' on each side of piston 48, a pair of peripheral annular grooves 21' and 22' are provided in the inner surface of sleeve 41 adjacent the ends of the latter, a resilient sealing member, preferably an O ring 23' and 24', being positioned in each of said grooves respectively. Desirably, an elongated annular groove 33' is provided in sleeve 41 between grooves 21' and 22'. The annular groove 22' which is desirably of greater length than groove 21', is of width at its inner end 25' slightly less than the diameter of O ring 24' and at its outer end 26' of greater width than such diameter, so that when the O ring 24' is at the inner end, it will fit snugly to provide a seal and when at the outer end will fit loosely.

The inner periphery of sleeve 41 at its end 51 is spaced slightly from the piston 48 as at 52 to ensure that clearance will be provided therebetween and a plurality of passageways 32' through the end 51 of the sleeve provide communication between chamber 18' and the wider end 26' of annular groove 22'.

As the operation of the embodiment of Fig. 2 is substantially identical to that of Fig. 1, it will be but briefly described.

Thus, after continued use of the unit, if the pressure in groove 33' becomes greater than that in chamber 18', the ring 24' will be forced toward the wider end 26' of groove 22' and hence the liquid under pressure in groove 33' will discharge through passageway 32' and the clearance 52 into chamber 18' to relieve the pressure in groove 33', thereby preventing extrusion of the O rings.

In the embodiment shown in Fig. 3, in which three seals are provided, the pressure relief means is incorporated in a pressure accumulator comprising a substantially cylindrical container 61 having plugs 62 and 63 screwed in its respective ends, said plugs having a gas inlet port 64 and a fluid port 65, respectively.

Slidably mounted in the container 11 is a piston 66 defining a gas chamber 67 and a fluid chamber 68 in communication with the ports 64 and 65, respectively. The piston has three spaced annular grooves 70, 71 and 72 in its periphery in each of which is positioned a resilient sealing member, preferably an O ring 73, 74 and 75 to provide a seal between the piston and the inner surface of the container. In addition, the piston has two elongated annular grooves 76, 77 positioned between grooves 70, 71 and 71, 72 respectively.

The annular groove 70 which is desirably of greater length than grooves 71 and 72, is of width at its inner end 78 slightly less than the diameter of the O ring and at its outer end 79 of greater width than such diameter so that when the O ring is at the inner end, it will fit snugly to provide a seal and when at the outer end will fit loosely.

The periphery of piston 66 at its end 81 is desirably spaced slightly from the wall of container 61 as at 82 to ensure that clearance will be provided therebetween and a plurality of passageways 83 through the end 81 of the piston provides communication between chamber 67 and the wide end 79 of annular groove 70.

The end 84 of piston 66 has a cavity 85, threaded as at 86 at its outer end and a passageway 87 leads from annular groove 77 into cavity 85. The end of passageway 87 in cavity 85 forms a seat for a ball valve 88 which is normally retained on its seat by a coil spring 89 compressed between ball 88 and a bored plug 91 screwed into the threaded end 86 of the cavity 85.

As previously described with respect to the embodiments of Figs. 1 and 2, when chambers 67 and 68 are initially charged with air and oil under pressure, as the pressure in grooves 76 and 77 will initially be atmospheric, there will be a differential between the pressures on opposed sides of the O rings 73 and 75 and consequently they will be forced toward each other, wedging into the slight space 93 between the wall of the container 61 and the periphery of the piston 66, to provide a dependable seal.

In use of the unit, a valve (not shown) controlling the oil port 65 is opened. As a result, the pressure in chamber 68 will drop and by reason of the greater pressure in chamber 67, the piston will move upwardly (Fig. 3) forcing oil from chamber 68.

As a result of such movement of the piston 66, oil from the wall may be forced past seal ring 75 into the annular groove 77 and the pressure in such groove, due to the compression of the air therein, will increase.

As the pressure in groove 77 increases and as the pressure in groove 76 is initially atmospheric, the O ring 74 will then wedge into the associated space 93 to provide a dependable seal at such point.

As long as the pressure in groove 77 remains below that in chamber 68, and the pressure in groove 76 is less than that in groove 77 and less than that in chamber 67, the three rings 73, 74 and 75 will each wedge into the associated space 93 to form a dependable seal to substantially preclude leakage between chambers 67 and 68.

If the pressure in groove 77 should rise with operation of the unit and movement of the piston and leakage past O ring 75, to exceed the pressure in chamber 68, based upon the setting of the spring 89, the ball 88 will be moved off its seat for relief of the pressure in groove 77 when it reaches a predetermined amount, and the O ring 75 will move away from the space 93.

When the pressure in groove 77 is relieved, it will fall to the value of the pressure in chamber 68 plus the spring pressure. As there is still a difference in the pressure on opposed sides of the O rings 73 and 74, they will still provide dependable seals to prevent leakage as the O ring 75 moves from space 93 to wedge into space 93' due to the greater pressure now in groove 77 than in chamber 68.

In the event that leakage should occur into groove 76 during movement of the piston and the pressure in groove 76 should exceed that in the chamber 67, the O ring seal 73 will move as previously described in the embodiment of Figs. 1 and 2 to relieve the pressure in such groove. Prior to such movement as the pressure in groove 76 will have risen to exceed that in groove 77, the O ring 74 will wedge into the associated space 93' to form a dependable seal.

It is of course to be understood that the ball valve or other mechanical one-way valve could be connected to groove 76 in place of the elongation of groove 70 and the associated passageway 83, or the groove 72 could be elongated and a passageway 82 provided and the ball valve 88 eliminated.

The construction shown in Fig. 3 also precludes extrusion of the O ring with resultant injury thereto and ensures a dependable seal to prevent leakage between chambers 67 and 68.

The embodiment shown in Fig. 4 is identical to that shown in Fig. 3 except instead of the passageway 87 and valve 88, the groove 72' is made identical to the groove 70 of Fig. 3, and the embodiment shown in Fig. 4 functions in the same manner as that shown in Fig. 3. Parts of Fig. 4 corresponding to those of Fig. 3 have the same reference numerals primed.

With the constructions herein described, during normal operation of the units, a difference will be maintained between the pressure on opposed sides of the O ring for dependable sealing action, yet without likelihood of extrusion of the O ring.

As many changes could be made in the above constructions, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. Equipment of the character described comprising a container having a pair of ports, a piston slidably mounted in said container between said ports and defining a chamber on each side thereof in communication respectively with said ports, said piston having three spaced annular grooves therein with a resilient seal ring annular in cross section in each of said three grooves, and having an additional pair of grooves between the three spaced grooves respectively, two of the three spaced grooves at each end of the piston respectively being of length greater than the diameter of the associated sealing ring, each of said two grooves being of width at its inner end slightly less than the diameter of the associated resilient ring and of width at its outer end greater than the diameter of said resilient ring, whereby each of said resilient rings when at the inner end of the associated groove will fit snugly therein to provide a seal between the piston and the wall of said container and when at the outer end of said groove will fit loosely therein to relieve the pressures in said additional pair of grooves when they exceed a predetermined amount.

2. Equipment of the character described comprising a container having a pair of ports, a piston slidably mounted in said container between said ports and defining a chamber on each side thereof in communication respectively with said ports, said piston having three spaced annular grooves therein with a resilient seal ring annular in cross section in each of said three grooves, and having an additional pair of grooves between the three spaced grooves respectively, one of the three spaced grooves at one end of the piston being of length greater than the diameter of the associated sealing ring, said groove being of width at its inner end slightly less than the diameter of the resilient ring and of width at its outer end greater than the diameter of said resilient ring, said piston end having a passageway therethrough leading from the adjacent chamber into the outer end of said groove, and the other end of said piston has a passageway leading from the adjacent chamber into one of said grooves of said additional pair near said other end of said piston and one-way valve means controls said last named passageway permitting flow of fluid in direction only from said groove.

3. Equipment of the character described comprising a container having a pair of ports, a sleeve affixed in said container, said sleeve having a pair of spaced annular grooves in its inner periphery and an additional annular groove intervening between said pair of spaced annular grooves, a resilient seal ring annular in cross section in each of said pair of spaced annular grooves, a piston slidably mounted in said sleeve between said ports and defining a chamber on each side thereof in communication respectively with said ports, one of the grooves of said pair of spaced annular grooves being of length greater than the diameter of the associated sealing ring, said groove being of width at its inner end slightly less than the diameter of the associated resilient ring and of width at its outer end greater than the diameter of said resilient ring, said sleeve having a passageway therethrough leading from the outer end of said groove into the associated chamber.

References Cited in the file of this patent

UNITED STATES PATENTS

| 2,064,969 | Carr et al. | Dec. 22, 1936 |
| 2,614,793 | Storm | Oct. 21, 1952 |
| 2,683,467 | Greer | July 13, 1954 |
| 2,734,531 | Bizak | Feb. 14, 1956 |